US009411609B2

(12) United States Patent
Sugitachi (10) Patent No.: US 9,411,609 B2
(45) Date of Patent: Aug. 9, 2016

(54) ELECTRONIC CONTROL APPARATUS

(71) Applicant: DENSO CORPORATION, Kariya, Aichi-pref. (JP)

(72) Inventor: Eiji Sugitachi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 14/021,199

(22) Filed: Sep. 9, 2013

(65) Prior Publication Data

US 2014/0075177 A1      Mar. 13, 2014

(30) Foreign Application Priority Data

Sep. 12, 2012   (JP) ................................ 2012-200696

(51) Int. Cl.
*G06F 1/26* (2006.01)
*G06F 9/44* (2006.01)
*G06F 1/32* (2006.01)

(52) U.S. Cl.
CPC ........ *G06F 9/442* (2013.01); *G06F 1/26* (2013.01); *G06F 1/3228* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 5,815,409 A | * | 9/1998 | Lee | ............................ G06F 1/30 365/226 |
| 5,862,394 A | * | 1/1999 | Watts | ........................ G06F 1/30 713/330 |
| 5,892,893 A | | 4/1999 | Hanf et al. | |
| 5,918,059 A | * | 6/1999 | Tavallaei | .................... G06F 1/26 713/300 |
| 5,960,208 A | * | 9/1999 | Obata | .................... G06F 1/1626 235/472.01 |
| 6,442,702 B1 | * | 8/2002 | Ishikawa et al. | .............. 713/340 |
| 8,650,422 B1 | * | 2/2014 | Goolsby | ............... G06F 1/3228 713/300 |
| 2007/0219671 A1 | | 9/2007 | Sakurai et al. | |
| 2007/0242300 A1 | | 10/2007 | Inai | |

(Continued)

FOREIGN PATENT DOCUMENTS

| | | | |
|---|---|---|---|
| JP | 4292236 A | 10/1992 | |
| JP | 5032142 A | 2/1993 | |

(Continued)

OTHER PUBLICATIONS

Chinese Office Action mailed Jan. 15, 2016 in the corresponding CN application No. 201310395165.9 (English translation attached).

*Primary Examiner* — Thomas Lee
*Assistant Examiner* — Mohammad A Rahman
(74) *Attorney, Agent, or Firm* — Posz Law Group, PLC (57) ABSTRACT

An electronic control apparatus as one of nodes connected to a communication line includes a microcomputer, a power integrated circuit for controlling power supply to the microcomputer, and a timer adjuster. The power integrated circuit has a timer for measuring a time period during which no data flows through a communication line. The timer is reset, when no data flows through the communication line and then data flows through the communication line. The power integrated circuit starts power supply to the microcomputer, when data flows through the communication line. The power integrated circuit stops the power supply when the timer reaches a threshold value. The timer adjuster prevents the timer from reaching the threshold value until the microcomputer completes a shutdown process.

10 Claims, 8 Drawing Sheets

(56) References Cited

U.S. PATENT DOCUMENTS

2012/0054526 A1  3/2012  Sugitachi
2012/0303989 A1* 11/2012  Hikichi .............. H04N 1/00891
                                              713/323

FOREIGN PATENT DOCUMENTS

| JP | 2002-062947 A | 2/2002 |
| JP | 2011-138468 A | 7/2011 |
| JP | 2011-235770 A | 11/2011 |

* cited by examiner

ELECTRONIC CONTROL APPARATUS

CROSS REFERENCE TO RELATED APPLICATION

This application is based on Japanese Patent Application No. 2012-200696 filed on Sep. 12, 2012, the contents of which are incorporated herein by reference.

FIELD

The present disclosure relates to an electronic control apparatus as one of nodes connected to a communication line to form a network.

BACKGROUND

A communication system having multiple nodes connected to a communication line is known. For example, in a communication system disclosed in JP-A-H4-292236, a master station is connected to multiple nodes (remote stations) via communication lines. In this communication system, each node is provided with a sleep function to reduce dark current. Specifically, when the sleep function detects that the master station stops communication for a predetermined continuous time period, the node is automatically put into a sleep mode.

SUMMARY

In the communication system disclosed in JP-A-H4-292236, there is a concern that the node switches to the sleep mode before completing a sleep process.

The present inventor considered a case where the node includes a microcomputer and a power integrated circuit (IC) for supplying power to the microcomputer. In this case, if the node switches to the sleep mode automatically upon detection that the master station stops communication for a predetermined continuous time period, the power supply from the power IC to the microcomputer may be stopped before the microcomputer completes a shutdown process.

In view of the above, it is an object of the present disclosure to provide an electronic control apparatus including a microcomputer and having a function to ensure that power supply to the microcomputer is maintained until the microcomputer completes a shutdown process.

According to an aspect of the present disclosure, an electronic control apparatus capable of being one of nodes connected to a communication line to form a network includes a microcomputer, a power integrated circuit, and a timer adjuster. The microcomputer has a transmitting terminal for transmitting data to the communication line and a receiving terminal for receiving data from the communication line. The microcomputer is capable of performing a predetermined shutdown process upon satisfaction of a predetermined shutdown condition. The power integrated circuit is capable of controlling power supply to the microcomputer. The power integrated circuit includes a determining section capable of determining whether data flows through the communication line and a timer capable of measuring a time period during which the determining section determines that no data flows through the communication line. The timer is reset when the determining section determines that no data flows through the communication line and then determines that data flows through the communication line. The power integrated circuit is capable of starting the power supply when the determining section determines that data flows through the communication line under a condition that the power supply is stopped. The power integrated circuit is capable of stopping the power supply when the timer reaches a predetermined threshold value under a condition that the power supply is performed. The timer adjuster is capable of preventing the timer from reaching the threshold value until the microcomputer completes the shutdown process.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings.

(First Embodiment)

Figure 1:
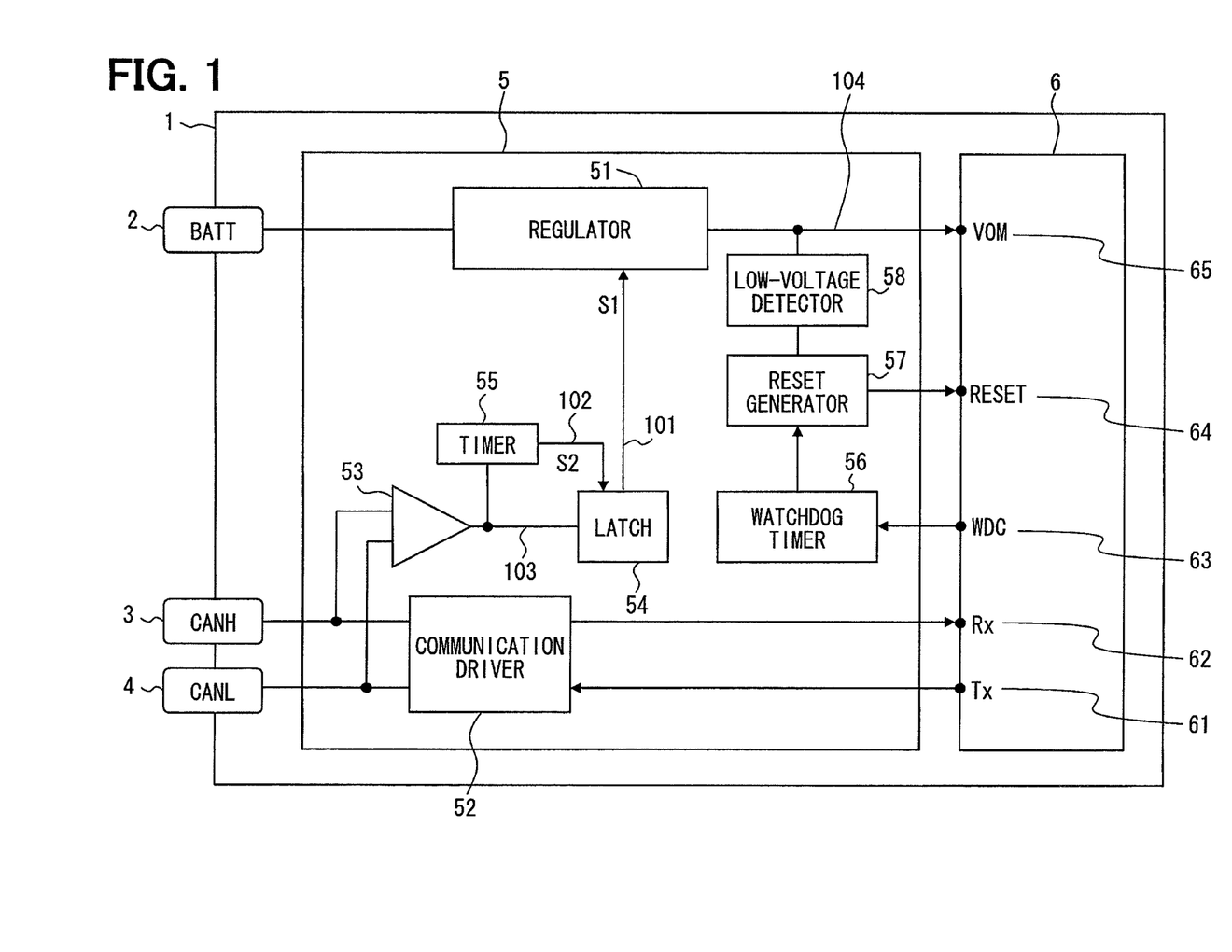
FIG. 1 is a block diagram of an electronic control apparatus according to a first embodiment of the present disclosure.

An electronic control apparatus 1 according to a first embodiment of the present disclosure is described below with reference to FIGS. 1-5. As shown in FIG. 1, the electronic control apparatus 1 includes a BATT terminal 2, a CANH terminal 3, a CANL terminal 4, a power IC 5, and a microcomputer 6. The electronic control apparatus 1 serves as one node in a network constructed with multiple nodes connected via communication lines. For example, according to the first embodiment, the electronic control apparatus 1 is mounted on a vehicle and connected to an in-vehicle network which complies with a controller area network (CAN) communication protocol.

The power IC 5 includes a power regulator 51, a communication driver 52, a comparator 53, a latch circuit 54, a timer 55, a watchdog timer 56, a reset generator 57, and a low-voltage detector 58.

The regulator 51 receives a battery voltage (e.g., 12 volts) from a battery of the vehicle via the BATT terminal 2. The regulator 51 steps down the battery voltage to a supply voltage VOM (e.g., 5 volts) and supplies the supply voltage VOM to the microcomputer 6. Specifically, the regulator 51 outputs the supply voltage VOM to a VOM terminal 65 of the microcomputer 6 via a power supply line 104. Thus, the power IC 5 has a management function to control (i.e., to start and stop) power supply to the microcomputer 6. The management function of the power IC 5 is described in detail later.

The communication driver 52 complies with the CAN communication protocol. The communication driver 52 is connected to a CAN bus (i.e., pair of wires) via the CANH terminal 3 and the CANL terminal 4. When the communication driver 52 receives a differential signal from another node via the CAN bus, the communication driver 52 transmits data indicated by the differential signal to a Rx terminal 62 of the microcomputer 6. Further, when the communication driver 52 receives data outputted from a Tx terminal 61 of the microcomputer 6, the communication driver 52 outputs a differential signal (i.e., dominant or recessive) to the CAN bus according to the data. In this way, the Tx terminal 61 serves as a transmitting terminal, and the Rx terminal 62 serves as a receiving terminal.

The comparator 53 determines whether data flows through the CAN bus. Specifically, the comparator 53 determines whether the CAN bus is in a dominant state or in a recessive state. A first input terminal of the comparator 53 is connected to a signal line which connects the CANH terminal 3 to the communication driver 52. A second input terminal of the comparator 53 is connected to a signal line which connects the CANL terminal 4 to the communication driver 52. In this way, the comparator 53 serves as a determining section capable of determining whether data flows through the CAN bus.

When the CAN bus is in the dominant state, the comparator 53 outputs a communication start signal to the latch circuit 54 via a signal line 103. In other words, when the CAN bus is in the dominant state, the comparator 53 determines that data flows through the CAN bus. In this way, when data communication on the CAN bus is performed, the comparator 53 outputs the communication start signal.

In contrast, when the CAN bus is in the recessive state, the comparator 53 does not output the communication start signal. In other words, when the CAN bus is in the recessive state, the comparator 53 determines that no data flows through the CAN bus.

The comparator 53 starts outputting the communication start signal synchronously with a first edge of the differential signal and stops outputting the communication signal synchronously with a second edge of the differential signal. The first edge appears when the CAN bus changes from the recessive state to the dominant state. The second edge appears when the CAN bus changes from the dominant state to the recessive state.

The latch circuit 54 starts outputting an activation signal S1 to the regulator 51 via a signal line 101 when receiving the communication start signal from the comparator 53. The latch circuit 54 continues to output the activation signal S1 until the latch circuit 54 is cleared by the timer 55.

According to the first embodiment, the activation signal S1 is a logic high level signal.

The timer 55 measures a time period during which the comparator 53 determines that no data flows through the CAN bus. The timer 55 is reset (i.e., a count value of the timer 55 is reset to an initial value such as zero), when the comparator 53 determines that data flows through the CAN bus after determining that no data flows through the CAN bus.

The timer 55 starts counting time in response to the communication start signal outputted from the comparator 53. Then, the timer 55 is reset, when the comparator 53 determines that data flows through the CAN bus after determining that no data flows through the CAN bus. In this way, when the comparator 53 determines that data flows through the CAN bus, the timer 55 is reset and starts counting time. That is, the timer 55 is reset and starts counting time synchronously with the first edge, which appears when the CAN bus changes from the recessive state to the dominant state.

Further, when the timer 55 reaches a predetermined threshold value, the timer 55 clears the latch circuit 54 so that the latch circuit 54 can stop outputting the activation signal S1. According to the first embodiment, when the timer 55 clears the latch circuit 54, the output signal of the latch circuit 54 changes from a logic high level to a logic low level.

For example, the timer 55 can continue to output a holding signal S2 to the latch circuit 54 via a signal line 102 until the timer 55 reaches the threshold value after starting counting time. Then, when the timer 55 reaches the threshold value, the timer 55 stops outputting the holding signal S2. When the timer 55 stops outputting the holding signal S2, the latch circuit 54 is cleared and stops outputting the activation signal S1.

It is noted that the maximum time of one dominant state is predetermined. Further, the maximum time of one recessive state when another node connected to the in-vehicle network operates is predetermined. The threshold value for the timer 55 is set longer than the sum of the maximum time of one dominant state and the maximum time of one recessive state. Thus, the timer 55 stops outputting the holding signal S2 to the latch circuit 54, when the CAN bus remains in the recessive state for a predetermined time period after the CAN bus changes from the dominant state to the recessive state. Alternatively, the threshold value for the timer 55 can be set to a value corresponding to the sum of the maximum time of one dominant state and an estimated time after which another other node connected to the in-vehicle network will be shut down.

The regulator 51 supplies the supply voltage VOM to the microcomputer 6, when the regulator 51 receives the activation signal S1 from the latch circuit 54. The regulator 51 keeps the supply voltage VOM at zero (i.e., stops supplying the supply voltage VOM), when the regulator 51 does not receive the activation signal S1. In other words, the regulator 51 supplies the supply voltage VOM to the microcomputer 6 when the output signal of the latch circuit 54 is a logic high level, and keeps the supply voltage VOM at zero when the output signal of the latch circuit 54 is a logic low level.

The low-voltage detector 58 is connected to the power supply line 104 through which the regulator 51 supplies the supply voltage VOM to the microcomputer 6. When the supply voltage VOM decreases below a predetermined level (e.g., 4.5 volts), the low-voltage detector 58 outputs a voltage reduction signal to the reset generator 57. In response to the voltage reduction signal, the reset generator 57 outputs an active-low reset signal to a reset terminal 64 of the microcomputer 6. Further, when a situation where the watchdog timer 56 does not receive a clear signal from a WDC terminal 63 of the microcomputer 6 continues for a predetermined time period, the watchdog timer 56 overflows and outputs a overflow signal to the reset generator 57, thereby resetting the microcomputer 6.

Although not shown in the drawings, the microcomputer 6 further includes a processor and a memory. The microcomputer 6 starts to operate when receiving the supply voltage VOM from the power IC 5. The processor performs predetermined processes including a shutdown process during a time period where the supply voltage VOM is supplied to the microcomputer 6. When a predetermined shutdown condition is met, the processor performs the shutdown process. Further, the microcomputer 6 has a timer adjusting function to prevent the timer 55 from reaching the threshold value until the microcomputer 6 completes the shutdown process. The timer adjusting function is described in detail later.

In the shutdown process, data necessary for the processor to perform the predetermined processes is stored in the memory. Further, a diagnosis process can be included in the shutdown process. In this case, when the processor performs the diagnosis process during the shutdown process, diagnosis data obtained in the diagnosis process is stored in the memory.

For example, the shutdown condition can be met, when the microcomputer 6 receives data, indicating that an ignition of the vehicle is OFF, through the CAN bus, or when the microcomputer 6 receives data, indicating that the microcomputer 6 should be shut down, from another node through the CAN bus. Alternatively, the shutdown condition can be met, when the microcomputer 6 determines by itself that the microcomputer 6 should be shut down.

Next, operations of the electronic control apparatus 1 are described below with reference to a timing chart of FIG. 2. When the CAN bus changes from the recessive state to the dominant state at a timing t1 under a condition that supply of the supply voltage VOM to the microcomputer 6 remains stopped, the comparator 53 outputs the communication start signal so that the latch circuit 54 can output the activation signal S1 to the regulator 51 via the signal line 101. At this timing, the timer 55 starts counting time in response to the communication start signal from the comparator 53. When receiving the activation signal S1 from the latch circuit 54, the regulator 51 starts supplying the supply voltage VOM to the microcomputer 6 via the power supply line 104.

In this way, when data starts flowing through the CAN bus under a condition that the supply of the supply voltage VOM from the power IC 5 to the microcomputer 6 remains stopped, the power IC 5 starts supplying the supply voltage VOM to the microcomputer 6. Thus, in the electronic control apparatus 1, the microcomputer 6 is activated automatically when data starts flowing through the CAN bus. In summary, the electronic control apparatus 1 has a wakeup function to activate the microcomputer 6 automatically when communication on the CAN bus starts.

Then, when the CAN bus changes from the recessive state to the dominant state at a timing t2 under a condition that the supply voltage VOM is being supplied to the microcomputer 6, the comparator 53 outputs the communication start signal so that the timer 55 can be reset and then restart counting time. Thus, at the timing t2, the timer 55 is reset before reaching the threshold value. Therefore, the timer 55 continues outputting the holding signal S2 to the latch circuit 54 via the signal line 102 so that the latch circuit 54 can continue to output the activation signal S1. Accordingly, the regulator 51 continues to supply the supply power VOM to the microcomputer 6.

Then, when the CAN bus changes from the recessive state to the dominant state at a timing t3 under a condition that the supply voltage VOM is being supplied to the microcomputer 6, the comparator 53 outputs the communication start signal so that the timer 55 can be reset and then restart counting time.

Figure 2:
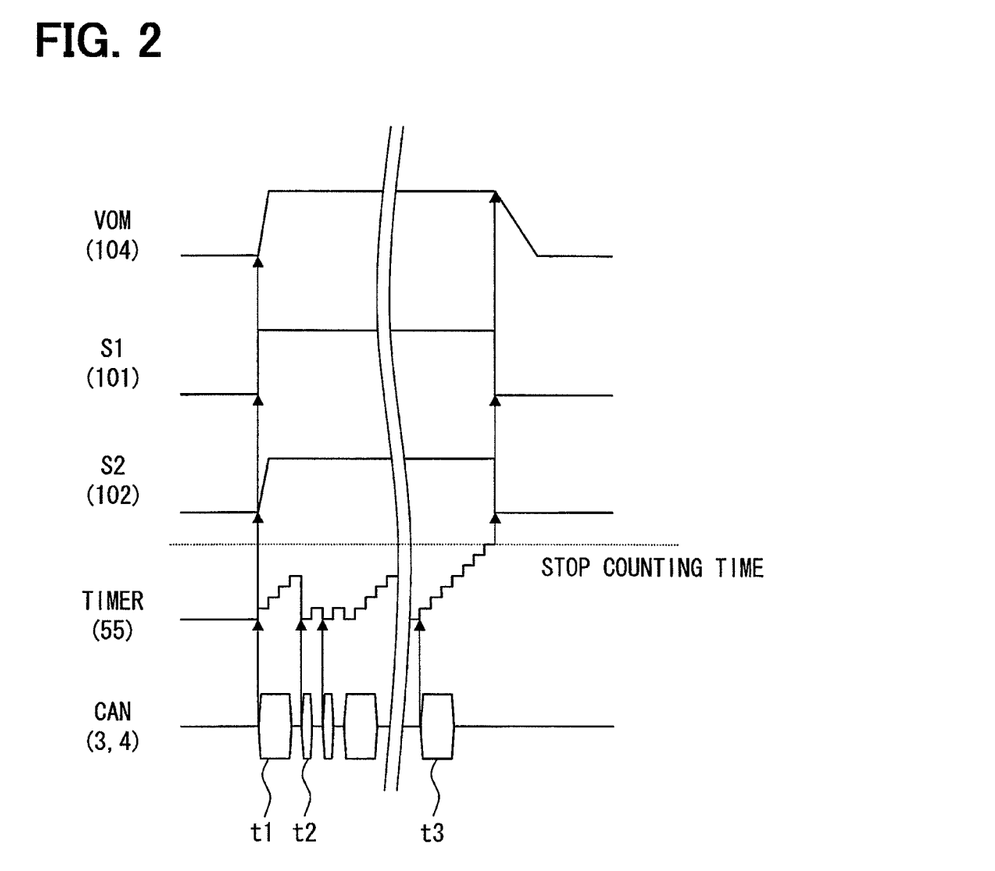
FIG. 2 is a timing diagram of the electronic control apparatus according to the first embodiment.

In FIG. 2, after the timing t3, the CAN bus remains in the recessive state so that the timer 55 can continue to count time without being reset. Then, when a predetermined time period elapses after the timing t3, the timer 55 reaches the threshold value. As a result, the timer 55 stops outputting the holding signal S2 so that the latch circuit 54 can stop outputting the activation signal S1 to the regulator 51. Thus, the regulator 51 stops supplying the supply voltage VOM to the microcomputer 6, when the timer 55 reaches the threshold value. It is noted that FIG. 2 shows an example where the microcomputer 6 changes the CAN bus from the recessive state to the dominant state by itself at the timing t3.

As described above, when a situation where no data flows through the CAN bus continues for a predetermined time period under a condition that the supply voltage VOM is being supplied from the power IC 5 to the microcomputer 6, the power IC 5 stops supplying the supply voltage VOM to the microcomputer 6. In this way, in the electronic control apparatus 1, the microcomputer 6 shuts down automatically when the situation where no data flows through the CAN bus continues for a predetermined time period.

Figure 3:
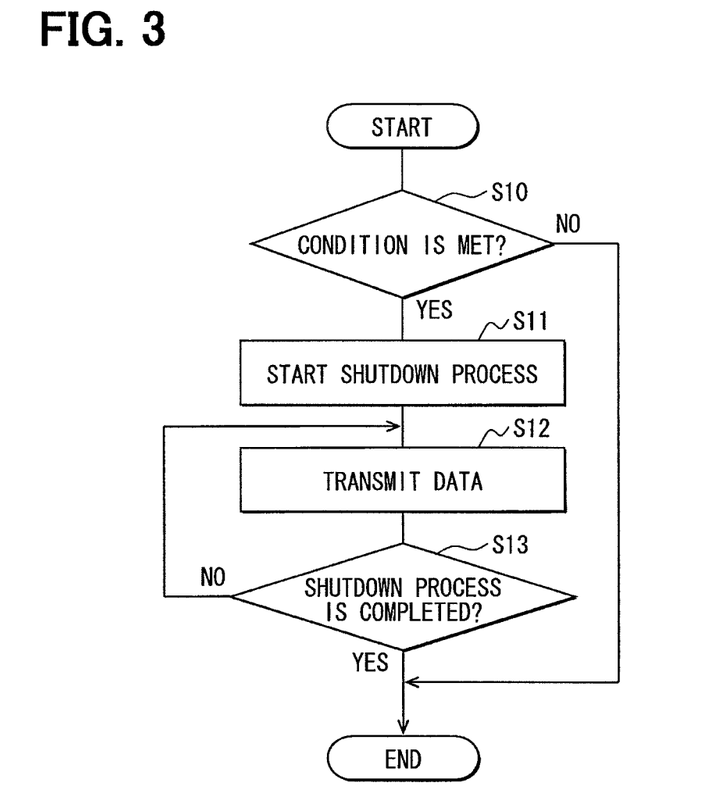
FIG. 3 is a flow diagram of a control process performed by a microcomputer of the electronic control apparatus according to the first embodiment.

FIG. 3 shows a flow chart of a control process performed by the microcomputer 6 during a time period where the microcomputer 6 is supplied with the supply voltage VOM.

The control process starts at S10, where the microcomputer 6 determines whether the shutdown condition is met. If the microcomputer 6 determines that the shutdown condition is met corresponding to YES at S10, the control process proceeds to S11. In contrast, if the microcomputer 6 does not determine that the shutdown condition is met corresponding to NO at S10, the control process ends.

At S11, the microcomputer 6 starts the shutdown process. Then, the control process proceeds from S11 to S12, where the microcomputer 6 transmits data. That is, when the microcomputer 6 starts the shutdown process, the microcomputer 6 transmits data to the CAN bus through the Tx terminal 61, thereby changing the CAN bus to the dominant state. A reason for changing the CAN bus to the dominant state is to maintain the supply of the supply voltage VOM to the microcomputer 6 during the shutdown process. It is noted that after the shutdown process is completed, the microcomputer 6 does not transmit data to the CAN bus until the microcomputer 6 is activated next time. The microcomputer 6 serves as a timer adjuster and a transmission controller recited in claims by performing S12.

Then, the control process proceeds from S12 to S13, where the microcomputer 6 determines whether the shutdown process is completed. If the microcomputer 6 determines that the shutdown process is completed corresponding to YES at S13, the control process ends. In contrast, if the microcomputer 6 does not determine that the shutdown process is completed corresponding to NO at S13, the control process returns to S12.

Figure 4:
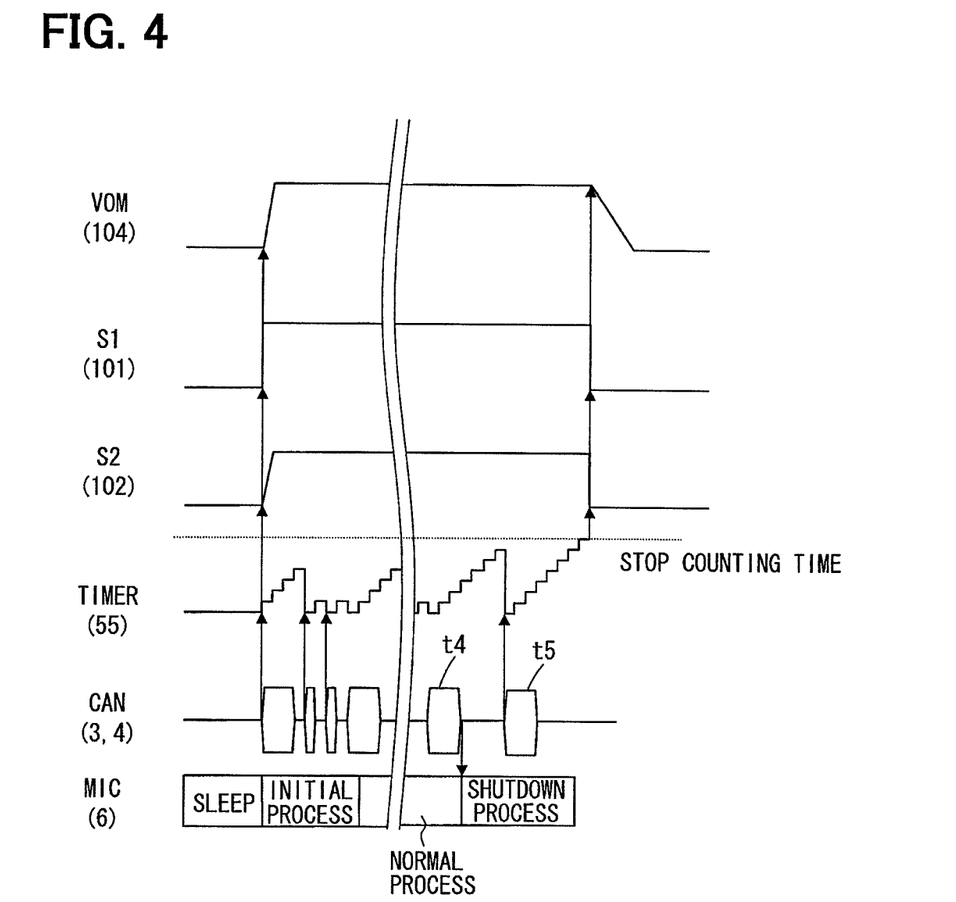
FIG. 4 is a timing diagram showing a change in a status of the microcomputer of the electronic control apparatus according to the first embodiment.

FIG. 4 is a timing chart illustrating a change in a status of the microcomputer 6. In an example of FIG. 4, when the microcomputer 6 receives data, indicating that an ignition of the vehicle is OFF, through the CAN bus at a timing t4, the microcomputer 6 starts the shutdown process. At the timing t4, since the CAN bus changes to the dominant state, the timer 55 starts counting time. The timer 55 continues to count time until the CAN bus changes to the dominant state next time.

In this case, when the microcomputer 6 starts the shutdown process, the microcomputer 6 transmits data to the CAN bus through the Tx terminal 61 at a timing t5. Thus, when the microcomputer 6 starts the shutdown process, the CAN bus changes to the dominant state.

Accordingly, at the timing t5, the comparator 53 determines that data flows through the CAN bus, and the timer 55 is reset. Thus, it is possible to prevent the timer 55 from reaching the threshold value until the microcomputer 6 completes the shutdown process. Therefore, the supply of the supply voltage VOM to the microcomputer 6 is maintained until the microcomputer 6 completes the shutdown process.

As described above, the data indicating that the ignition of the vehicle is OFF flows through the CAN bus at the timing t4. Therefore, like the microcomputer 6, another node on the CAN bus shuts down by performing a corresponding shutdown process after the timing t4. Accordingly, the CAN bus remains in the recessive state after the timing t4. At the timing t5, the timer 55 is reset and restarts counting time. And then, when the timer 55 reaches the threshold value, the power IC 5 stops supplying the supply voltage VOM to the microcomputer 6.

As described above, according to the first embodiment, when the microcomputer 6 starts the shutdown process, the microcomputer 6 changes the CAN bus to the dominant state by outputting data from the Tx terminal 61, which is generally used to perform communication with another node on the CAN bus. Therefore, there is no need to add a special terminal to the microcomputer 6.

Further, according to the first embodiment, the timer 55 starts counting time, when the comparator 53 determines that data flows through the CAN bus. Specifically, the timer 55 starts counting time, when the comparator 53 determines that no data flows through the CAN bus and then determines that data flows through the CAN bus. In such an approach, if a dominant failure occurs anywhere on the CAN bus, the timer 55 reaches the threshold value so that the supply of the supply voltage VOM from the power IC 5 to the microcomputer 6 can be stopped. The dominant failure is a failure that forces the CAN bus to be in the dominant state.

(Modification of the First Embodiment)

Figure 5:
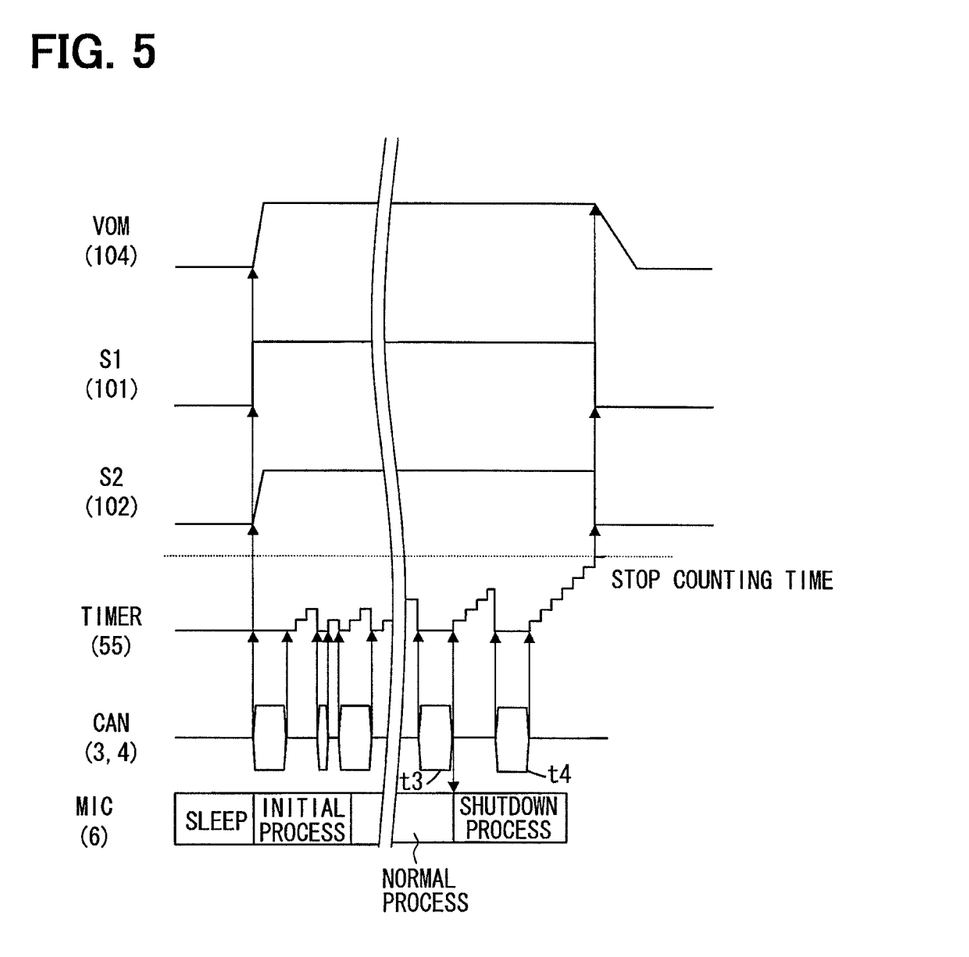
FIG. 5 is a timing diagram of an electronic control apparatus according to a modification of the first embodiment.

The first embodiment can be modified, for example, as follows. As shown in FIG. 5, the timer 55 can start counting time, when the comparator 53 determines that no data flows through the CAN bus. Specifically, in a modification shown in FIG. 5, the timer 55 starts counting time, when the comparator 53 determines that data flows through the CAN bus and then determines that no data flows through the CAN bus. More specifically, when the CAN bus changes to the recessive state, the timer 55 is reset and then restarts counting time. In such an approach, even if a dominant failure occurs in another node on the CAN bus, the supply of the supply voltage VOM from the power IC 5 to the microcomputer 6 can be maintained.

In the first embodiment, to prevent the timer 55 from reaching the threshold value until the completion of the shutdown process, the microcomputer 6 changes the CAN bus to the dominant state by outputting data from the Tx terminal 61 only once during the shutdown process. The microcomputer 6 can output data from the Tx terminal 61 in various manners upon the start of the shutdown process to prevent the timer 55 from reaching the threshold value until the completion of the shutdown process. For example, the microcomputer 6 can output data from the Tx terminal 61 two or more times during the shutdown process. For example, the microcomputer 6 can continue to output data from the Tx terminal 61 during the shutdown process.

(Second Embodiment)

An electronic control apparatus 11 according to a second embodiment of the present disclosure is described below with reference to FIGS. 6-8. A first difference between the first and second embodiments is in that the power IC 5 of the electronic control apparatus 11 has a detection circuit 591. A second difference between the first and second embodiments is in that the microcomputer 6 of the electronic control apparatus 11 sets the Tx terminal 61 to a high impedance state when the shutdown process is completed. These differences are described in detail below.

Like in the first embodiment, in the second embodiment, the microcomputer 6 performs the shutdown process when the shutdown condition is met. Then, when the microcomputer 6 completes the shutdown process, the microcomputer 6 performs a high impedance process to set the Tx terminal 61 to a high impedance state. In FIG. 8, the high impedance process is denoted as the "Hz process".

Figure 6:
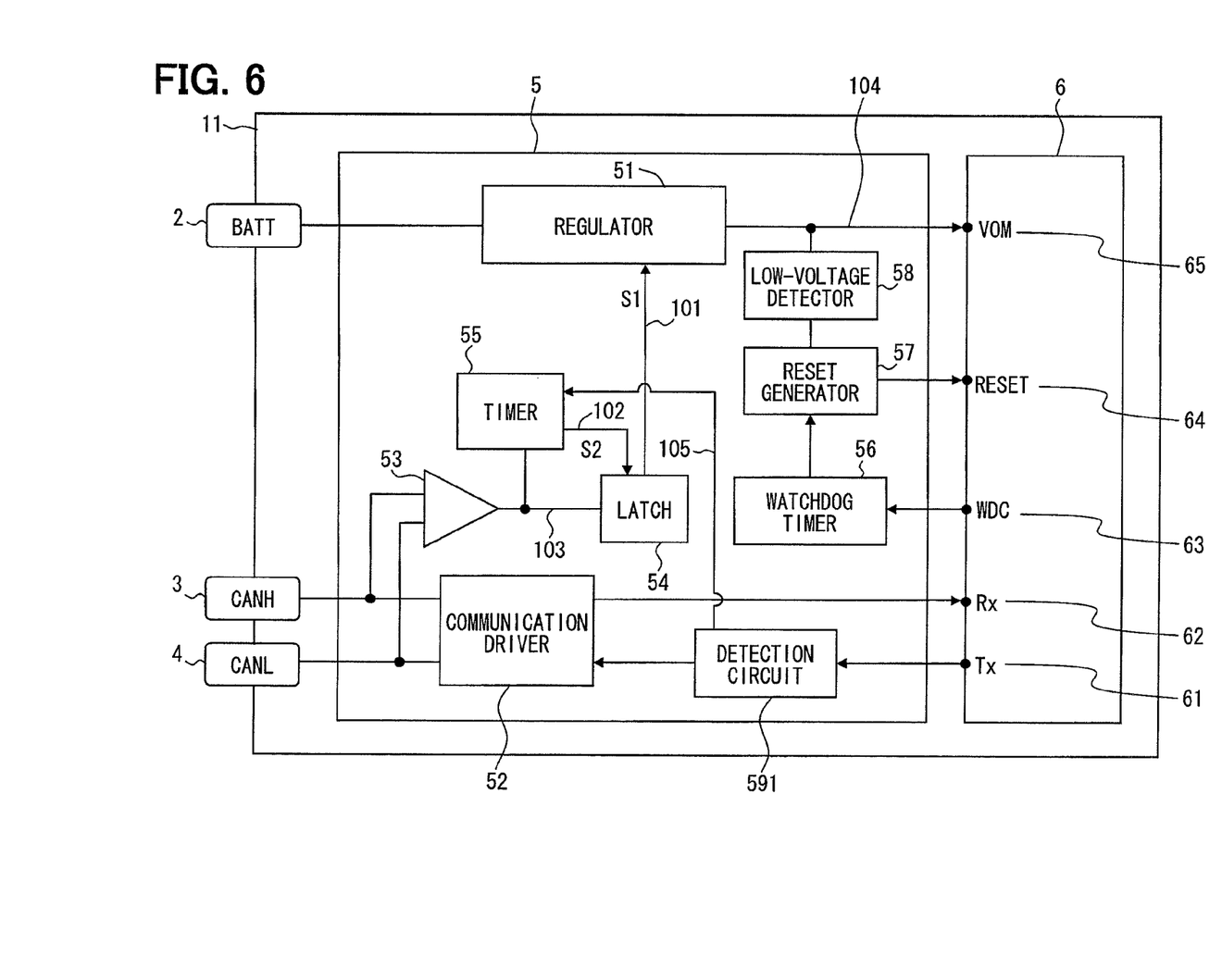
FIG. 6 is a block diagram of an electronic control apparatus according to a second embodiment of the present disclosure.

As shown in FIG. 6, the detection circuit 591 is incorporated in the power IC 5 and interposed between the communication driver 52 and the Tx terminal 61. Further, the detection circuit 591 is connected to the timer 55 through a signal line 105.

Figure 7:
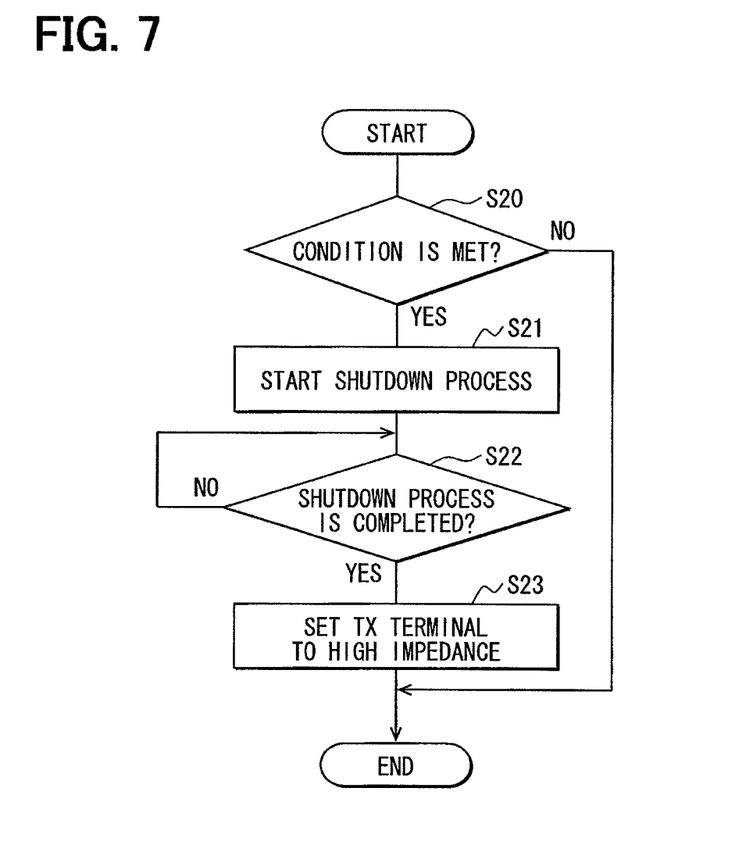
FIG. 7 is a flow diagram of a control process performed by a microcomputer of the electronic control apparatus according to the second embodiment.
Figure 8:
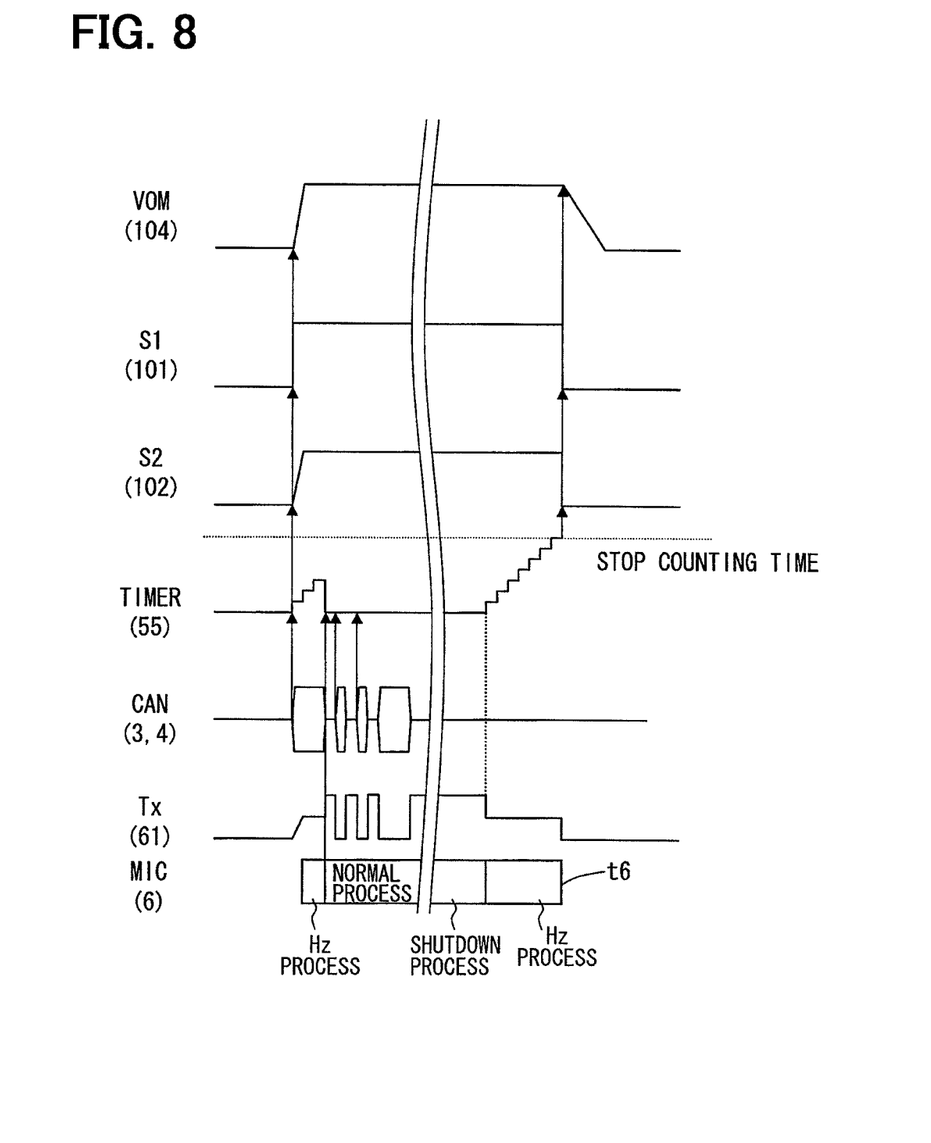
FIG. 8 is a timing diagram of the electronic control apparatus according to the second embodiment.

FIG. 7 shows a flow chart of a control process performed by the microcomputer 6 during a time period where the microcomputer 6 is supplied with the supply voltage VOM. Step S20 of FIG. 7 is equivalent to S10 of FIG. 3, step S21 of FIG. 7 is equivalent to S11 of FIG. 3, and step S22 of FIG. 7 is equivalent to S13 of FIG. 3. Therefore, explanations of steps S20, S21, and S22 are left out.

When the microcomputer 6 completes the shutdown process, the control process proceeds to S23, where the microcomputer 6 sets the Tx terminal 61 to the high impedance state. For example, as shown in FIG. 8, when the microcomputer 6 completes the shutdown process, the microcomputer 6 sets the Tx terminal 61 to the high impedance state at a timing t6. The microcomputer 6 serves as a timer adjuster and a terminal controller recited in claims by performing S23.

When the Tx terminal 61 is set to the high impedance state, the detection circuit 591 causes the Tx terminal 61 to be at an intermediate potential (e.g., 2.5 volts) between a first potential and a second potential. The first potential is a potential appearing at the Tx terminal 61 when data is transmitted. The second potential is a potential appearing at the Tx terminal 61 when data is received. Further, the detection circuit 591 detects whether the Tx terminal 61 is at the intermediate potential. When the detection circuit 591 detects that the Tx terminal 61 is at the intermediate potential, the detection circuit 591 commands the timer 55 to start counting time. In response to the command from the detection circuit 591, the timer 55 starts counting time. The detection circuit 591 serves as a timer adjuster and a timer commander recited in claims.

As described above, according to the second embodiment, the timer 55 starts counting time after the microcomputer 6 completes the shutdown process. In such an approach, it is possible to prevent the timer 55 from reaching the threshold value until the microcomputer 6 completes the shutdown process. This can be achieved only by setting the Tx terminal 61 to the high impedance state after the microcomputer 6 completes the shutdown process. Therefore, there is no need to add a special terminal to the microcomputer 6. Thus, the electronic control apparatus 11 of the second embodiment can have the same advantages as the electronic control apparatus 1 of the first embodiment.

Further, according to the second embodiment, the supply of the supply voltage VOM to the microcomputer 6 can be maintained until the microcomputer 6 completes the shutdown process without changing the CAN bus to the dominant state. In other words, the supply of the supply voltage VOM to the microcomputer 6 can be maintained until the microcomputer 6 completes the shutdown process without activating another node on the CAN bus.

As described above, the detection circuit 591 causes the Tx terminal 61 to be at the intermediate potential, when the Tx terminal 61 is set to the high impedance state. Further, the detection circuit 591 detects whether the Tx terminal 61 is at the intermediate potential. Since such a detection circuit is known, a detailed explanation of the detection circuit 591 is left out.

(Modifications)

While the present disclosure has been described with reference to embodiments thereof, it is to be understood that the disclosure is not limited to the embodiments and constructions. The present disclosure is intended to cover various modification and equivalent arrangements.. In addition, while the various combinations and configurations, other combinations and configurations, including more, less or only a single element, are also within the spirit and scope of the present disclosure.

In the embodiments, the CAN is employed as a communication protocol of the network to which the electronic control apparatus to which the present disclosure is applied is connected. The communication protocol is not limited to the CAN. For example, a FlexRay, which is a registered trademark of the DaimlerChrysler AG Corporation, can be employed as the communication protocol.

In the embodiments, the electronic control apparatus is mounted on a vehicle and connected to an in-vehicle network. Alternatively, the present disclose can be applied to an electronic control apparatus which is not mounted on a vehicle.

In the embodiments, the comparator 53 is employed as a determining section capable of determining whether data flows through the CAN bus. The determining section is not limited to a comparator. A device or circuit capable of determining whether data flows through the CAN bus can be used instead of the comparator 53.

What is claimed is:

1. An electronic control apparatus capable of being one of nodes connected to a communication line to form a network, the electronic control apparatus comprising:
    a microcomputer having a transmitting terminal for transmitting data to the communication line and a receiving terminal for receiving data from the communication line, the microcomputer is configured to perform a predetermined shutdown process upon satisfaction of a predetermined shutdown condition; and
    a power integrated circuit is configured to control a power supply to the microcomputer, the power integrated circuit including a determining section configured to determine whether the communication line is in a recessive state or a dominant state and a timer configured to measure a time period from when the communication line changes from a recessive state to a dominant state, the timer being reset when the communication line changes from the recessive state to the dominant state, the timer starts measuring the time period when the communication line changes from the recessive state to the dominant state, the power integrated circuit is configured to start the power supply when the communication line changes from the recessive state to the dominant state under a condition that the power supply is stopped, the power integrated circuit is configured to stop the power supply when the timer reaches a predetermined threshold value under a condition that the power supply is performed; wherein
    the microcomputer is configured to, during at least a portion of the predetermined shutdown process, change the communication line from the recessive state to the dominant state, and thereafter changing the communication line from the dominant state back to the recessive state.

2. The electronic control apparatus according to claim 1, further comprising:
    a timer adjuster that is provided in the microcomputer and including a transmission controller, wherein
    when the microcomputer starts the shutdown process, the transmission controller transmits data to the communication line through the transmission terminal to change the communication line from the recessive state to the dominant state.

3. The electronic control apparatus according to claim 2, wherein
    the timer starts counting time when the determining section determines that data flows through the communication line.

4. The electronic control apparatus according to claim 2, wherein
    the timer starts counting time when the determining section determines that no data flows through the communication line.

5. An electronic control apparatus capable of being one of nodes connected to a communication line to form a network, the electronic control apparatus comprising:
    a microcomputer having a transmitting terminal for transmitting data to the communication line and a receiving terminal for receiving data from the communication line, the microcomputer is configured to perform a predetermined shutdown process upon satisfaction of a predetermined shutdown condition;
    a power integrated circuit configured to control a power supply to the microcomputer, the power integrated circuit including a determining section configured to determine whether data flows through the communication line and a timer configured to measure a time period from when the transmitting terminal is set to a high impedance state, the timer being reset and starts measuring the time period when the transmitting terminal is set to the high impedance state, the power integrated circuit configured to start the power supply when the timer starts measuring the time period, the power integrated circuit configured to stop the power supply when the timer reaches a predetermined threshold value under a condition that the power supply is performed; and
    a timer adjuster partially provided in the microcomputer, a portion of the timer adjuster partially provided in the microcomputer being configured to, upon completion of the predetermined shutdown process, set the transmitting terminal to the high impedance state.

6. The electronic control apparatus according to claim 5, wherein
    the timer adjuster includes a terminal adjuster and a timer commander,
    the terminal adjuster is provided in the microcomputer and sets the transmitting terminal to the high impedance state upon completion of the shutdown process, and
    the timer commander is provided in the power integrated circuit and causes the transmitting terminal to be at an intermediate potential between a first potential and a second potential when the transmitting terminal is set to the high impedance state,
    the first potential is a potential appearing at the transmitting terminal when data is transmitted,
    the second potential is a potential appearing at the transmitting terminal when data is received, and
    when the timer commander detects that the transmitting terminal is at the intermediate potential, the timer commander commands the timer to start counting time.

7. An electronic control apparatus capable of being one of nodes connected to a communication line to form a network, the electronic control apparatus comprising:
    a microcomputer having a transmitting terminal for transmitting data to the communication line and a receiving terminal for receiving data from the communication line, the microcomputer is configured to perform a predetermined shutdown process upon satisfaction of a predetermined shutdown condition; and
    a power integrated circuit is configured to control a power supply to the microcomputer, the power integrated circuit including a determining section is configured to determine whether the communication line is in a recessive state or a dominant state and a timer configured to measure a time period from when the communication line changes from a dominant state to a recessive state, the timer being reset when the communication line changes from the recessive state to the dominant state, the timer starts measuring the time period when the communication line changes from the dominant state to the recessive state, the power integrated circuit is configured to start the power supply when the communication line changes from the recessive state to the dominant state under a condition that the power supply is stopped, the power integrated circuit is configured to stop the power supply when the timer reaches a predetermined threshold value under a condition that the power supply is performed; wherein the microcomputer is configured to, during at least a portion of the predetermined shutdown process, change the communication line from the recessive state to the dominant state, and thereafter changing the communication line from the dominant state back to the recessive state.

8. The electronic control apparatus according to claim 7, further comprising:

a timer adjuster that is provided in the microcomputer and including a transmission controller, wherein when the microcomputer starts the shutdown process, the transmission controller transmits data to the communication line through the transmission terminal to change the communication line from the recessive state to the dominant state.

9. The electronic control apparatus according to claim 8, wherein the timer starts counting time when the determining section determines that data flows through the communication line.

10. The electronic control apparatus according to claim 8, wherein the timer starts counting time when the determining section determines that no data flows through the communication line.

* * * * *